US007688817B2

(12) United States Patent
Celi, Jr. et al.

(10) Patent No.: US 7,688,817 B2
(45) Date of Patent: Mar. 30, 2010

(54) REAL TIME TRANSPORT PROTOCOL (RTP) PROCESSING COMPONENT

(75) Inventors: Joseph Celi, Jr., Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/107,144

(22) Filed: Apr. 15, 2005

(65) Prior Publication Data

US 2006/0233163 A1 Oct. 19, 2006

(51) Int. Cl.
*H04L 12/56* (2006.01)

(52) U.S. Cl. ........................ 370/389; 370/392; 709/231

(58) Field of Classification Search ......... 370/260–262, 370/389, 392, 400, 401, 351–356; 709/228, 709/231, 237
See application file for complete search history.

(56) References Cited

U.S. PATENT DOCUMENTS 5,648,760 A 7/1997 Kumar
6,259,691 B1 * 7/2001 Naudus ...................... 370/352
6,526,139 B1 * 2/2003 Rousell et al. ......... 379/406.03
6,819,678 B2 * 11/2004 Sylvain ...................... 370/466
6,996,094 B2 * 2/2006 Cave et al. .................. 370/356
7,007,062 B1 * 2/2006 Serenyi et al. .............. 709/203
7,035,252 B2 * 4/2006 Cave et al. .................. 370/356
7,295,547 B2 * 11/2007 Oshima et al. ............. 370/352
2001/0021186 A1 * 9/2001 Ono et al. ................... 370/352
2003/0043782 A1 3/2003 Laursen et al.
2003/0081594 A1 5/2003 Lee
2003/0182001 A1 9/2003 Radenkovic et al.
2004/0172255 A1 9/2004 Aoki et al.
2005/0094628 A1 * 5/2005 Ngamwongwattana et al. .......................... 370/352
2007/0299939 A1 * 12/2007 Johnston ..................... 709/219

* cited by examiner

*Primary Examiner*—Pankaj Kumar
*Assistant Examiner*—Duc T Duong
(74) *Attorney, Agent, or Firm*—Novak Druce + Quigg

(57) ABSTRACT

A communication method can include the step of establishing a communication session between two endpoints based upon the real-time transport protocol (RTP). During the communication session, discrete packets containing digitally encoded audio can be exchanged between the two endpoints resulting in a continuous audio flow being established in real-time between the two endpoints. During the communication session, one or more of the two endpoints can convey RTP data to a remotely located RTP audio processor. The RTP data can include information necessary for the RTP audio processor to establish an audio stream with the one of the two endpoints that did not convey the RTP data to the RTP audio processor. The RTP audio processor can establish the audio stream without terminating the communication session between the two endpoints.

14 Claims, 3 Drawing Sheets

REAL TIME TRANSPORT PROTOCOL (RTP) PROCESSING COMPONENT

BACKGROUND

1. Field of the Invention

The present invention relates to the field of media communications, and, more particularly, to a Real Time Transport Protocol (RTP) processing component that performs one or more audio processing tasks during an RTP-based communication system between two communication endpoints.

2. Description of the Related Art

Real Time Transport Protocol (RTP) is an Internet-standard protocol for the transport of real-time data, including audio and video. RTP is used in virtually all Voice Over Internet Protocol (VOIP) architectures, for videoconferencing, media-on-demand, and other applications. RTP can be used over multicast or unicast network services. RTP is an end-to-end transport protocol that provides services such as payload type identification, sequence numbering, time stamping, lost packet detection, timing reconstruction, and delivery monitoring. When RTP is used to stream video, a video server can maintain session states in order to correlate requests with a stream. Unlike the hypertext transfer protocol (HTTP) that is basically an asymmetric protocol where a client issues requests and a server responds, RTP allows both a video server and client to issue requests to the other.

Conventional implementations of RTP can establish full duplex audio streams between a video server and a caller, where the streams are transmitted over an Internet-protocol (IP) network through a VOIP gateway. During transmission, RTP audio can be compressed, decompressed, packetized, depacketized, and otherwise processed. These processing activities consume CPU cycles, network bandwidth, and utilize Input/Output ports of numerous computing devices of the IP network through which the audio is conveyed. Because RTP is a real-time protocol where packet transfer rates for audio packets of approximately 20 milliseconds between sender and receiver can be necessary, timely delivery and processing of the streamed audio can be essential.

Using conventional techniques, resource scarcity is common at the server and the client endpoints participating in the RTP communication. Intermittent resource shortfalls can result in quality compromises that can be perceived at either end of the transmission. A technique is needed that permits clients and video servers to utilize the RTP in a fashion where resource shortfalls can be gracefully accommodated.

SUMMARY OF THE INVENTION

A detachable Real Time Transport Protocol (RTP) audio processor to which an endpoint participating in a RTP communication can offload processing as detailed by embodiments of the inventive arrangements is disclosed herein. The RTP audio processor can operate as a stand-alone entity that can execute and be located anywhere within a network space that is communicatively linked to the communication endpoints. The RTP audio processor can be dynamically utilized at need whenever resources are scarce. The RTP audio processor can be used by a client endpoint, by a server endpoint, or both. In one embodiment, the RTP audio processor can be executed in a network space local to a Voice Over Internet Protocol (VOIP) gateway. Additionally, the RTP audio processor can be implemented in software, hardware, firmware, or a combination thereof.

The RTP audio processor can include a variety of features designed to enhance RTP communication sessions. One feature can handle the streaming of silence packets on behalf of either endpoint. Because a large portion of a typical full duplex audio communication session consists of extended periods of silence, the silence streaming feature of the RTP audio processor can result in huge resource savings for either or both communication endpoints. Other RTP features include, but are not limited to, the playing of predefined audio recordings, playing a sampling of noise, joining additional audio streams from a third source into a stream directed to either endpoint, providing hold music and other audio, and the like.

Silence packets as used herein can include any audio packets not containing audio information that is to be conveyed between endpoints. That is, silence packets can convey a low level of background "noise" so that a communication participant at either end-point is able to discern that the communication circuit is still active. Silence packets can be conveyed whenever endpoint generated audio is below a designated threshold or can be conveyed whenever endpoint generated audio is identified as containing "noise" as opposed to audio content.

The present invention can be implemented in accordance with numerous aspects consistent with material presented herein. For example, one aspect of the present invention can include a communication method where a communication session between two endpoints based upon the RTP can be established. During the communication session, discrete packets containing digitally encoded audio can be exchanged between the two endpoints resulting in a continuous audio flow being established in real-time between the two endpoints. During the communication session, one or more of the two endpoints can convey RTP data to a remotely located RTP audio processor. The RTP data can include information necessary for the RTP audio processor to establish an audio stream with the one of the two endpoints that did not convey the RTP data to the RTP audio processor. The RTP audio processor can establish the audio stream without terminating the communication session between the two endpoints.

Another aspect of the present invention can include an RTP audio processor. The RTP audio processor can be a stand-alone processing component located within a computing processing space external to two communication endpoints that exchange a continuous stream of audio data with each other using the RTP. The stand-alone processing component can be configured to establish an audio stream with at least one of the two endpoints without terminating a pre-existing RTP communication session between the two endpoints. The audio stream can convey digitally encoded audio processed by the stand-alone processing component using a plurality of discrete packets containing the digitally encoded audio in accordance with RTP.

It should be noted that various aspects of the invention can be implemented as a program for controlling computing equipment to implement the functions described herein, or a program for enabling computing equipment to perform This program may be provided by storing the program in a magnetic disk, an optical disk, a semiconductor memory, any other recording non-transitory medium implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
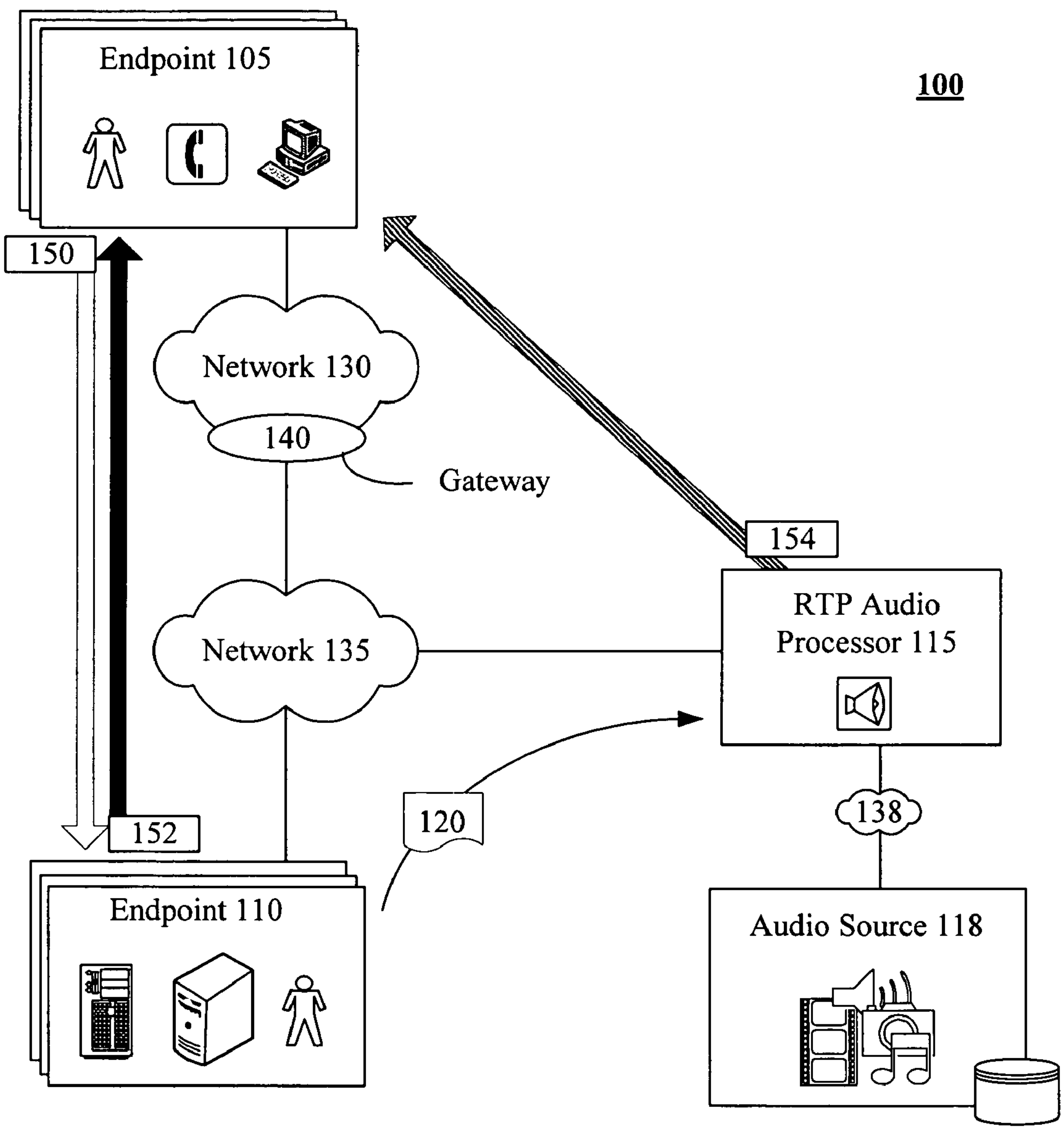
FIG. 1 is a schematic diagram of a communication system for communicating between two endpoints in accordance with an embodiment of the inventive arrangements disclosed herein.

FIG. 1 is a schematic diagram of a communication system 100 for communicating between two endpoints in accordance with an embodiment of the inventive arrangements disclosed herein. System 100 can include a communication endpoint 105 and a communication endpoint 110 communicatively linked to one another via one or more networks, such as network 130 and network 135.

Communication endpoint 105 and 110 can each represent an entity participating within a communication session. Endpoint 105 and 110 can each represent a human or an automated communication system. At each endpoint 105 and 110, communications can occur through customer premise equipment (CPE) such as a telephone or through a computing device such as a voice server or personal computer.

The communication session between endpoint 105 and endpoint 110 can be based upon the Real-Time Transport Protocol (RTP). For example, a communication session between endpoints 105 and 110 can be a Voice Over Internet Protocol (VOIP) communications session. That is, a series of packets each containing digitally encoded information such as audio and video data can be conveyed between endpoints to establish a real-time communication. The real time communication is represented by communication flow 150 from endpoint 105 to endpoint 110 and by communication flow 152 from endpoint 110 to endpoint 105.

In one embodiment, the communication session can be a full duplex telephony communication between two humans, one being represented by endpoint 105 and the other by endpoint 110. In another embodiment, the communication session can be a multicast or unicast broadcast from a media server to one or more media destinations, wherein endpoint 105 can represent one of the media destinations and endpoint 110 can represent the media server.

An RTP audio processor 115 can be communicatively linked to endpoint 105 and/or endpoint 110 via network 135. The RTP audio processor 115 can be implemented within software, hardware, firmware, or a combination thereof, where the RTP audio processor 115 operates in a stand-alone fashion within a computing space external to endpoint 105 and endpoint 110. For example, the RTP audio processor 115 can be a software processor disposed in a network element remotely located from endpoint 105 and/or endpoint 110. In one embodiment, the RTP audio processor 115 can be located within a computing space local to gateway 140, which can be a VOIP gateway.

The RTP audio processor 115 can perform one or more audio processing functions for endpoint 105 and/or endpoint 110 using RTP. The RTP audio processor 115 can be dynamically utilized during a pre-existing communication session, without terminating a previously established, RTP based communication session between endpoints 105 and 110.

For example, endpoint 110 can convey RTP data 120 to RTP audio processor 115. The RTP data 120 can include information necessary for the RTP audio processor 115 to establish a communication stream 154 with endpoint 105, which is the endpoint that did not convey the RTP data 120. The communication stream 154 can be an RTP based communication flow that conveys audio and/or video information in real-time. The RTP data 120 can include, but is not limited to, an IP address for endpoint 105, a port address that accepts communication flow 152 data, IP header information, RTP header information, RTP payload information, and the like.

Additionally, RTP audio processor 115 can be configured to originate or modify RTP report packets. Report packets such as receiver reception packets, sender packets, and source description packets can be originated by RTP audio processor 115 or intercepted and modified by the RTP audio processor 115 in accordance with audio processing tasks performed by the RTP audio processor 115. The RTP audio processor 115 report packets can, for example, include information such as the number of packets sent, the number of packets lost, inter-arrival jitter, transmission rates, and other data that can be used for joining packets into a real-time communication stream and for diagnosing the same.

In one embodiment, a halting point for communication stream 152 information can be contained within RTP data 120 so that communication stream 152 can be halted at approximately the same time that communication stream 154 is initiated, which can use the same ports and communication session information as communication stream 152. Thus, endpoint 105 can experience an apparent continuous incoming communication flow even though the communication flow has actually been switched from endpoint 110 (communication flow 152) to the RTP audio processor 115 (communication flow 154).

In various configurations, the RTP audio processor 115 can function as a communication intermediary between endpoint 110 and endpoint 105, can function as an alternative communication source dynamically used in place of endpoint 110, and can function as a communication source providing content to endpoint 105 in addition to the content provided by endpoint 110.

Audio source 118 can be connected to RTP audio processor 115 via network 138, where communication stream 154 can include content obtained from the audio source 118. The audio source 118 can be a network streaming source, such as an Internet radio source, that can stream content to the RTP audio processor 115 to be included within communication stream 154. For example, music can be played to endpoint 105 via communication stream 154 obtained from audio source 118, whenever a communication participant at endpoint 105 has been placed on hold. The audio source 118 can include a repository of prerecorded audio clips, video clips, and other media files that can be added to the communication stream 154 upon demand. In such an example, the audio source 118 can be a file repository locally available to the RTP audio processor 115. Pre-recorded media files can include, but are not limited to, digitally encoded background noise, pre-recorded messages such as voice-mail messages, canned voice recordings, commonly utilized video segments, audio help and information files, and the like.

It should be appreciated that the arrangements shown in FIG. 1 are for illustrative purposes only and that the invention is not strictly limited in this regard. For example, in one contemplated embodiment, network 130 and network 135 can be a single, integrated packet-based communication network. In another contemplated embodiment, an additional network (a circuit-based telephony network) can be included between endpoint 110 and network 135 (a packet-based network). Thus, a telephony communication session can be established between endpoint 105 (assuming network 130 is a circuit-based telephony network) and endpoint 110, where information can be conveyed within network 135 in accordance with the RTP specifications. In still another contemplated embodiment, the RTP audio processor 115 can be utilized bi-directionally, thus providing at least one audio processing task for audio directed towards endpoint 110 while providing at least one audio processing task for audio directed towards endpoint 105.

Networks 130, 135, and 138 can represent any communication mechanism capable of conveying digitally encoded information. Each of the networks 130, 135, and 138 can include a telephony network like a public switched telephone network (PSTN) or a mobile telephone network, a computer network such as a local area network or a wide area network, a cable network, a satellite network, a broadcast network, and the like. Further, each of the networks 130, 135, and 138 can use wireless as well as line based communication pathways.

The various endpoints, components, and networks of system 100 can be implemented in a distributed or centralized fashion. The functionality attributable to the various components of system 100 can be combined or separated in different manners than those illustrated herein. For instance, the audio source 118 and the RTP audio processor 115 can be implemented as a single integrated component in one embodiment of the present invention.

Figure 2:
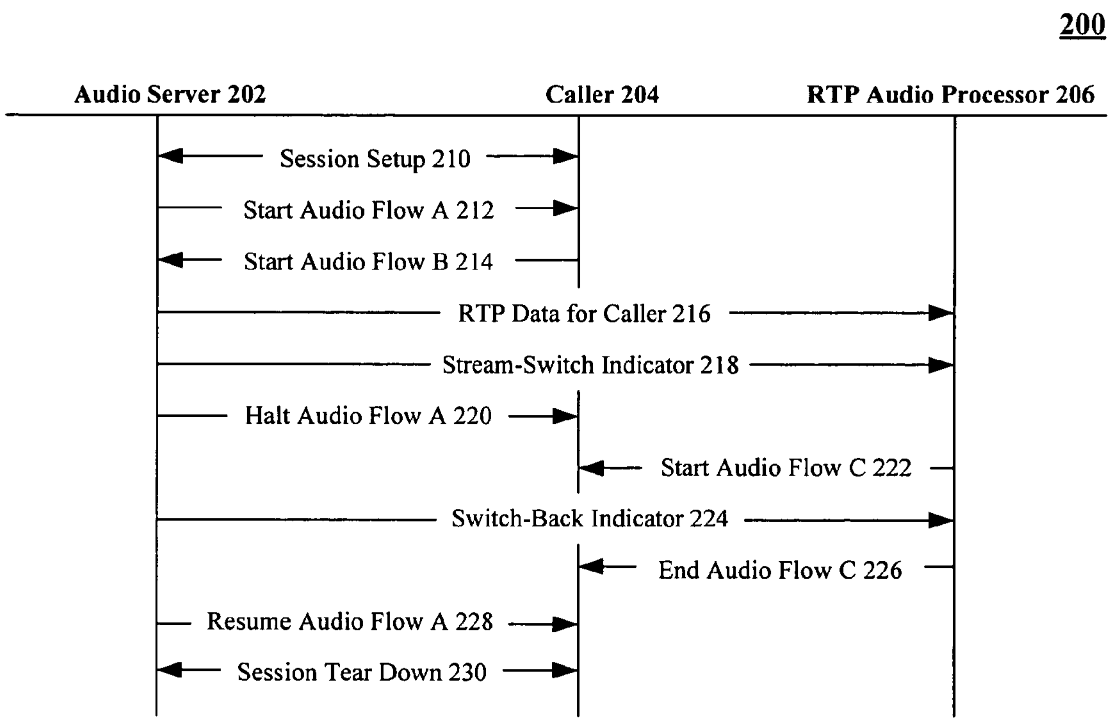
FIG. 2 is an information flow diagram of a system that includes an RTP audio processor in accordance with the inventive arrangements disclosed herein.

FIG. 2 is an information flow diagram of a system 200 that includes an RTP audio processor in accordance with the inventive arrangements disclosed herein. The RTP audio processor 206 can perform at least one audio processing task on behalf of audio server 202. Specifically, the audio server 202 can establish a RTP communication session with caller 204. When silence is being transmitted by the audio server 202, the RTP audio processor 206 can be used to transmit the silence to the caller 204, thereby freeing up resource of the audio server 202. The audio server 202 and caller 204 can represent contemplated communication endpoints, such as endpoints 105 and 110 of system 100, with which the RTP audio processor 206 can be utilized in conjunction. For example, the audio server 202 can be a voice server, an interactive voice response system, or a media streaming server as previously detailed.

In system 200, session setup information 210 can be exchanged between the audio server 202 and the caller 204. Audio server 202 can then convey start audio flow A information 212 to caller 204, which initiates an audio flow from the audio server 202 to the caller 204. Start audio flow B data 214 can then be conveyed from the caller 204 to the audio server 202, which initiates an audio flow from the caller 204 to the audio server 202.

RTP data 216 for communicating with caller 204 can then be conveyed from the audio server 202 to the RTP audio processor 206. The audio server 202 can convey stream-switch indicator 218 to RTP audio processor 206. In one embodiment, the stream-switch indicator 218 can be conveyed whenever the audio server 202 is conveying silence so that the silence can instead be conveyed from the RTP audio processor 206. The audio server 202 can then halt audio flow A directed to caller 204, as shown by data flow 220. At approximately the same time that the audio flow A is halted (so that the caller 204 does not perceive an interruption in audio) an audio flow C can be started from RTP audio processor 206 to caller 204, as shown by data flow 222. It should be noted that while flow A was halted and audio flow C was being conveyed from the RTP audio processor 206 to the caller 204, the audio flow B still proceeded in an uninterrupted fashion, permitting audio to be conveyed via audio flow B from the caller 204 to the audio server 202.

After a period of time, such as when the period of silence is over and the audio server 202 has content to convey to the caller 204, the audio server 202 can convey switch-back indicator 224 to the RTP audio processor 206. In response, the RTP audio processor 206 can end audio flow C, as shown by data flow 226. The audio server 202 can resume audio flow A at approximately the same time, as shown by data flow 228.

Video, audio, and other media information can continue to be exchanged between the audio server 202 and the caller 204 via audio flows A and B until the communication session is to be terminated. Then, session tear down data 230 can be exchanged between audio server 202 and caller 204, resulting in the communication session ending.

Figure 3:
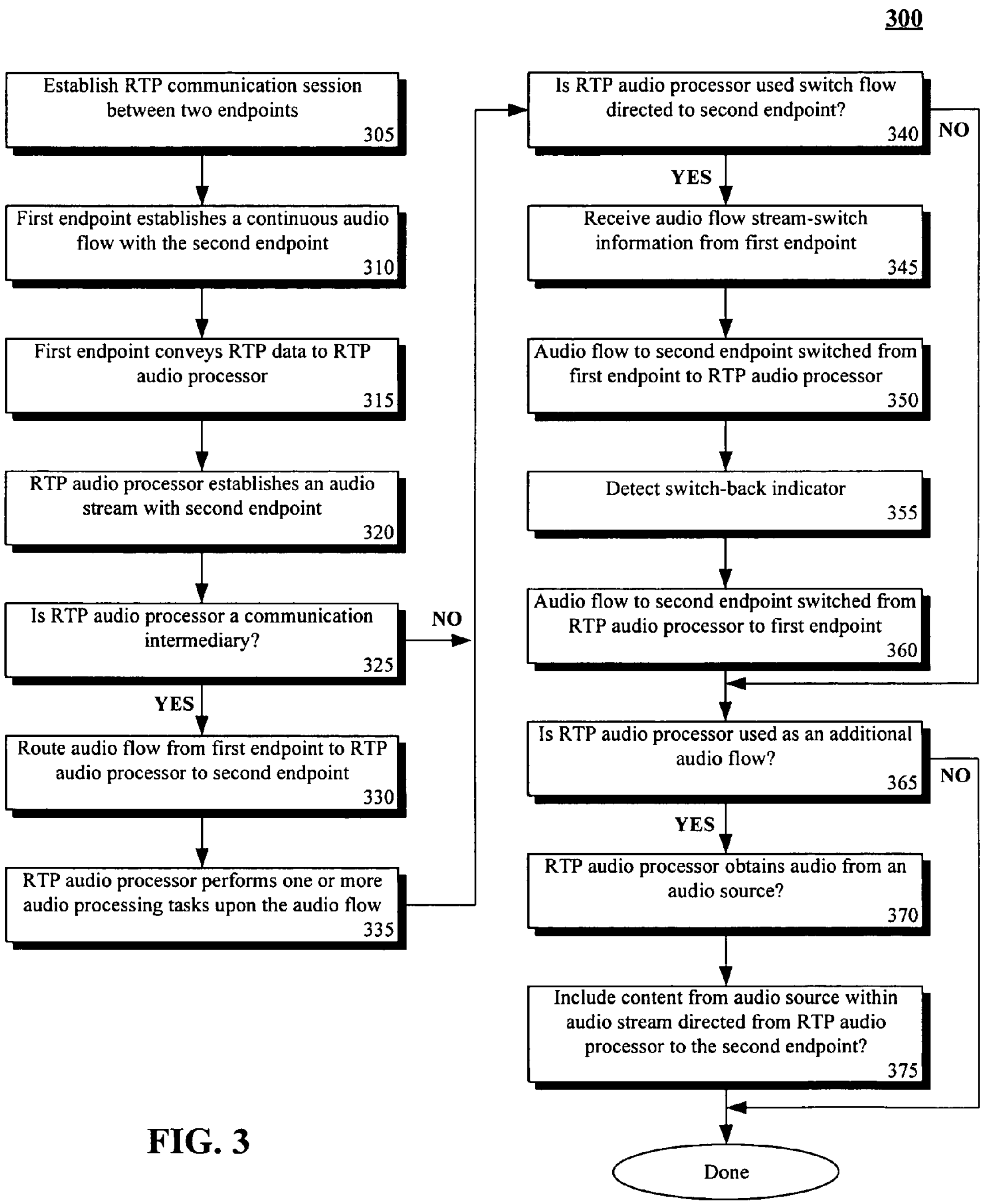
FIG. 3 is a flow chart of a method for utilizing an RTP audio processor in accordance with the inventive arrangements disclosed herein.

FIG. 3 is a flow chart of a method 300 for utilizing an RTP audio processor in accordance with the inventive arrangements disclosed herein. Method 300 can be performed in the context of a communication session that uses the RTP specification. For example, the method 300 can be performed in the context of the system 100, yet is not to be construed as limited in this regard.

Method 300 can begin in step 305 where an RTP communication session can be established between two endpoints. In step 310, the first endpoint can establish a continuous audio flow with the second endpoint in real or near-real time. This audio flow can be part of a media flow that also includes video and/or graphical information. Additionally, the audio flow can be a unicast or multicast communication flow, or can represent one direction of a full duplex VOIP communication. Regardless, the established audio flow can permit discrete packets containing digitally encoded audio to be exchanged from the first endpoint to the second endpoint.

In step 315, the first endpoint can convey RTP data to an RTP audio processor. The RTP data can include information necessary for the RTP audio processor to establish an audio stream with the second endpoint. In step 320, the RTP audio processor can establish the audio stream. This audio stream can be established in various ways depending upon the configuration in which the RTP audio processor is being used. Regardless of the configuration, however, the RTP audio processor can perform at least one audio processing task using the RTP specification.

In step 325, for example, a determination can be made as to whether the RTP audio processor is to be used as a communication intermediary between the first endpoint and the second endpoint. If the determination of step 325 is no, the method can skip to step 340. Otherwise, the method can progress to step 330.

In step 330, an audio flow can be routed from the first endpoint to the RTP audio processor to the second endpoint. While being used as a communication intermediary, as shown in step 335, the RTP audio processor can perform one or more audio processing tasks upon the audio flow. Illustrative RTP audio processing tasks can include, but are not limited to, packetization and depacketization tasks, compression and decompression tasks, spectral subtraction tasks, echo cancellation tasks, pitch and volume adjustment tasks, noise reduction or cancellation tasks, voice activity detection tasks, RTP monitoring or reporting tasks, and the like. In this manner, resource consuming tasks that would otherwise be consumed by the first endpoint or second endpoint can be offloaded to the RTP audio processor. In one contemplated embodiment, the offloading can occur in a dynamic fashion, whenever available resources of either endpoint become scarce.

In step 340, it can be determined whether the RTP audio processor is to be used to switch the communication flow that is directed to the second endpoint. That is, is the RTP audio data to be used to transmit an audio flow, for at least a period of time, in place of the audio flow that was being provided by the first endpoint. The switching can occur at approximately the same time so that it is transparent from the perspective of the second endpoint. When the determination of step 340 is to switch the communication flow, the method can progress from step 340 to step 345. Otherwise, the method can jump from step 340 to step 365.

In step 345, the RTP audio processor can receive audio flow stream-switch information from the first endpoint. In step 350, the audio flow to the second endpoint can be switched from the first endpoint to the RTP audio processor. In step 355, a switch-back indicator can be detected. In step 360, the audio flow to the second endpoint can be switched from the RTP audio processor to the first endpoint.

Many reasons exist for temporarily switching the audio flow from the first endpoint to the RTP audio processor. One such reason is to save resources of the first endpoint during periods of relative silence, where the RTP audio processor can transmit the silence instead of the first endpoint. Alternatively, the RTP audio processor can have access to previously recorded media files that can be played directly to the second endpoint from the RTP audio processor, as opposed to routing from the RTP audio processor to the first endpoint then to the second endpoint, which would not be an efficient use of computing resources. Further, the RTP audio processor can be linked to a remotely located audio or media flow, such as an event broadcast or pre-existing telephony conference, which can be routed upon demand to the second endpoint.

Occasionally, especially when an additional audio stream is being conveyed via the RTP audio processor, it can be desirable to utilize the RTP audio processor to add an additional audio flow into a pre-existing communication between the first and second endpoints. This additional audio flow can be unidirectionally added so that it is received by a one of the two endpoints, or can be added to communication streams received by both endpoints. This situation is indicated in step 365, where a decision as to whether to add an additional audio flow can be made. When an audio flow is to be added, the method can progress to step 370.

In step 370, the RTP audio processor can obtain audio or other media information from an audio source. In step 375, content from the audio source can be included within the audio stream directed from the RTP audio processor to the second endpoint.

It should be noted that the various operations performed by the RTP audio processor are not mutually exclusive and can be performed in combinations. For example, the RTP audio processor can be used as a communication switch to transmit silence between either or both of the endpoints and can be simultaneously used to add an additional audio flow from an audio source. In another example, the RTP audio processor can be used to perform noise cancellation tasks within both bi-directional audio flows between communicatively linked endpoints while also being used by a voice server (one of the endpoints) to play prerecorded audio files to a caller (another one of the endpoints). Accordingly, the RTP audio processor is a very flexible resource that can be utilized in many situations to enhance RTP based communications and to conserve resources of communication endpoints during RTP based communication sessions.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A communication method comprising the steps of:

establishing a communication session between two endpoints based upon the real-time transport protocol (RTP), wherein for the duration of the communication session a plurality of discrete packets containing digitally encoded audio are exchanged between the two endpoints that results in a continuous audio flow being established in real-time between the two endpoints;

during said communication session, at least one of said two endpoints conveying RTP data to a remotely located detachable RTP audio processor, said RTP data including information necessary for the RTP audio processor to establish an audio stream with the one of the two endpoints that did not convey the RTP data to the RTP audio processor; and said RTP audio processor establishing said audio stream without terminating the communication session between the two endpoints;

wherein the RTP audio processor performs at least one of the following tasks:

performing at least one audio processing task upon the audio stream;

switching the audio stream from the conveying endpoint to the RTP audio processor for a period of time; and adding an additional audio flow to the existing audio stream;

wherein the established communication session is a full duplex audio communication, and wherein the endpoint that conveys the RTP data is the first endpoint and wherein the endpoint with which the RTP audio processor establishes the audio stream is the second endpoint;

the first endpoint sending a stream-switch indicator to the RTP audio processor, where the stream-switch indictor indicates that the first endpoint is to halt an audio flow to the second endpoint and that the RTP audio processor is to initiate said audio stream with the second endpoint while the audio flow is halted; and the first endpoint halting an audio flow directed to the second endpoint for approximately the duration of said audio stream in accordance with the stream-switch indicator;

the first endpoint sending a switch-back indicator to the RTP audio processor, where the switch-back indicator indicates that the first endpoint is to resume the halted audio flow and that the RTP audio processor is to discontinue said audio stream; and the RTP audio processor discontinuing said audio stream in accordance with the switch-back indicator;

wherein the audio stream comprises silence packets, and wherein the audio flow is halted for a period during which a communication channel from the first endpoint to the second endpoint is relatively silent.

2. The communication method of claim 1, wherein said communication session is a voice over internet protocol (VOIP) communication session.

3. The communication method of claim 1, wherein a communication channel between the RTP audio processor and the second endpoint within which the audio stream is conveyed is a simplex communication channel.

4. The communication method of claim 1, further comprising the steps of:

the RTP audio processor obtaining audio from an audio source external from either of said two endpoints; and the audio stream containing audio content obtained from said audio source.

5. The communication method of claim 4, wherein the audio source comprises at least one previously established audio file accessible by said RTP audio processor.

6. The communication method of claim 5, wherein said audio files comprise a file containing digitally encoded background noise and no other audio content.

7. The communication method of claim 4, wherein the audio source streams audio to the RTP audio processor, which the RTP audio processor conveys to the selected one of the two endpoints.

8. The communication method of claim 1, wherein said at least one audio processing task comprises a compression task or a decompression task for the audio flow.

9. The communication method of claim 1, wherein said at least one audio processing task comprises a packetization task or a depacketization task for the audio flow.

10. The communication method of claim 1, wherein said at least one audio processing task comprises at least one audio task selected from the group consisting of a spectral subtraction task, an echo cancellation task, and a voice activity detection task.

11. The communication method of claim 1, wherein the endpoint conveying said RTP data comprises a speech server.

12. The communication method of claim 1, wherein the endpoint conveying said RTP data terminates in a human caller interfacing with a telephony network using customer premise equipment, said RTP data originating from within said telephony network.

13. A communication system comprising:

at least two endpoints, a communication session being established between the two endpoints based upon the real-time transport protocol (RTP), wherein for the duration of the communication session a plurality of discrete packets containing digitally encoded audio are exchanged between the two endpoints that results in a continuous audio flow being established in real-time between the two endpoints; and a remotely located detachable RTP audio processor, during the communication session at least one of the two endpoints conveying RTP data to the RTP audio processor, the RTP data including information necessary for the RTP audio processor to establish an audio stream with the one of the two endpoints that did not convey the RTP data to the RTP audio processor, the RTP audio processor establishing the audio stream without terminating the communication session between the two endpoints;

wherein the RTP audio processor performs at least one of the following tasks:

performing at least one audio processing task upon the audio stream;

switching the audio stream from the conveying endpoint to the RTP audio processor for a period of time; and adding an additional audio flow to the existing audio stream;

wherein the established communication session is a full duplex audio communication, and wherein the endpoint that conveys the RTP data is the first endpoint and wherein the endpoint with which the RTP audio processor establishes the audio stream is the second endpoint;

wherein the first endpoint sends a stream-switch indicator to the RTP audio processor, where the stream-switch indictor indicates that the first endpoint is to halt an audio flow to the second endpoint and that the RTP audio processor is to initiate the audio stream with the second endpoint while the audio flow is halted, and the first endpoint halts an audio flow directed to the second endpoint for approximately the duration of the audio stream in accordance with the stream-switch indicator;

wherein the first endpoint sends a switch-back indicator to the RTP audio processor, where the switch-back indicator indicates that the first endpoint is to resume the halted audio flow and that the RTP audio processor is to discontinue the audio stream, and the RTP audio processor discontinues the audio stream in accordance with the switch-back indicator; and wherein the audio stream comprises silence packets, and the audio flow is halted for a period during which a communication channel from the first endpoint to the second endpoint is relatively silent.

14. A non-transitory machine readable storage, having stored thereon a computer program having a plurality of code sections executable by a machine for causing the machine to perform the steps of:

establishing a communication session between two endpoints based upon the real-time transport protocol (RTP), wherein for the duration of the communication session a plurality of discrete packets containing digitally encoded audio are exchanged between the two endpoints that results in a continuous audio flow being established in real-time between the two endpoints;

during said communication session, at least one of said two endpoints conveying RTP data to a remotely located detachable RTP audio processor, said RTP data including information necessary for the RTP audio processor to establish an audio stream with the one of the two endpoints that did not convey the RTP data to the RTP audio processor; and said RTP audio processor establishing said audio stream without terminating the communication session between the two endpoints;

wherein the RTP audio processor performs at least one of the following tasks:

performing at least one audio processing task upon the audio stream;

switching the audio stream from the conveying endpoint to the RTP audio processor for a period of time; and adding an additional audio flow to the existing audio stream;

wherein the established communication session is a full duplex audio communication, and wherein the endpoint that conveys the RTP data is the first endpoint and wherein the endpoint with which the RTP audio processor establishes the audio stream is the second endpoint;

the first endpoint sending a stream-switch indicator to the RTP audio processor, where the stream-switch indictor indicates that the first endpoint is to halt an audio flow to the second endpoint and that the RTP audio processor is to initiate said audio stream with the second endpoint while the audio flow is halted; and the first endpoint halting an audio flow directed to the second endpoint for approximately the duration of said audio stream in accordance with the stream-switch indicator;

the first endpoint sending a switch-back indicator to the RTP audio processor, where the switch-back indicator indicates that the first endpoint is to resume the halted audio flow and that the RTP audio processor is to discontinue said audio stream; and the RTP audio processor discontinuing said audio stream in accordance with the switch-back indicator;

wherein the audio stream comprises silence packets, and wherein the audio flow is halted for a period during which a communication channel from the first endpoint to the second endpoint is relatively silent.

* * * * *